(12) United States Patent
Swarthout et al.

(10) Patent No.: US 10,184,522 B2
(45) Date of Patent: Jan. 22, 2019

(54) BOTTOM BRACKET ASSEMBLY AND BICYCLE

(71) Applicant: Specialized Bicycle Components, Inc., Morgan Hill, CA (US)

(72) Inventors: Conner Swarthout, Morgan Hill, CA (US); Chuck Teixeira, Santa Cruz, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 160 days.

(21) Appl. No.: 14/992,629

(22) Filed: Jan. 11, 2016

(65) Prior Publication Data
US 2016/0223022 A1    Aug. 4, 2016

Related U.S. Application Data

(60) Provisional application No. 62/110,323, filed on Jan. 30, 2015.

(51) Int. Cl.
*B23K 1/00*        (2006.01)
*F16C 35/00*       (2006.01)
(Continued)

(52) U.S. Cl.
CPC ............ *F16C 35/00* (2013.01); *B21D 26/033* (2013.01); *B21D 53/86* (2013.01); *B23K 1/0008* (2013.01);
(Continued)

(58) Field of Classification Search
CPC ........... F16C 35/00; B21D 53/86; B62K 3/02; B62K 3/04; B62K 19/34
See application file for complete search history.

(56) References Cited

U.S. PATENT DOCUMENTS 2,453,061 A    11/1948  Bissout et al.
3,903,754 A *   9/1975  Morroni ................. B62K 19/34
                                                    74/594.1
(Continued)

FOREIGN PATENT DOCUMENTS

FR         757201      12/1933
JP       03-231087    10/1991
JP      2006-290139   10/2006

OTHER PUBLICATIONS

International Search Report and Written Opinion for Application No. PCT/US2010/045067 dated Oct. 7, 2010 (10 pages).
(Continued)

*Primary Examiner* — Anne Marie M Boehler
*Assistant Examiner* — Michael R Stabley
(74) *Attorney, Agent, or Firm* — Michael Best & Friedrich LLP

(57) ABSTRACT

A bottom bracket shell assembly includes left and right sidewalls. The left and right sidewalls each include a peripheral rim and a lateral surface. The lateral surfaces define a generally circular void. A bearing support is disposed at the voids of the left and right sidewalls. Left and right first bosses project away from the left and right sidewalls at a periphery of the lateral surface. The first bosses include boss ends configured to connect to a first tubular member. The left and right sidewalls are joined at the peripheral rim to form contiguous front and rear surfaces. The present disclosure maximizes the strength to weight ratio for low modulus frame materials.

14 Claims, 10 Drawing Sheets

(51) Int. Cl.
*B62K 19/34* (2006.01)
*B21D 26/033* (2011.01)
*B21D 53/86* (2006.01)
*B23K 31/02* (2006.01)
*B62K 3/02* (2006.01)

(52) U.S. Cl.
CPC ............... *B23K 31/02* (2013.01); *B62K 3/02* (2013.01); *B62K 19/34* (2013.01)

(56) References Cited

U.S. PATENT DOCUMENTS

| | | | |
|---|---|---|---|
| 4,252,384 A * | 2/1981 | Duvoisin | B62K 19/34 384/431 |
| 4,479,662 A * | 10/1984 | Defour | B62K 19/22 280/281.1 |
| 4,550,927 A * | 11/1985 | Resele | B62K 19/22 280/281.1 |
| 4,583,755 A | 4/1986 | Diekman et al. | |
| 4,699,233 A | 10/1987 | Koga et al. | |
| 4,813,591 A | 3/1989 | Mueller et al. | |
| 5,056,704 A | 10/1991 | Martin et al. | |
| 5,363,715 A | 11/1994 | Huggins et al. | |
| 5,456,481 A * | 10/1995 | Allsop | B29C 45/006 280/274 |
| 5,464,240 A * | 11/1995 | Robinson | A61G 5/10 280/281.1 |
| 5,791,673 A * | 8/1998 | Patterson | B62K 3/10 280/226.1 |
| 5,876,054 A * | 3/1999 | Olson | B62K 19/16 264/258 |
| 5,913,529 A * | 6/1999 | Patterson | B62K 3/10 280/226.1 |
| 6,123,353 A | 9/2000 | Bennett et al. | |
| 6,270,104 B1 * | 8/2001 | Nelson | B29C 70/446 280/281.1 |
| 6,365,865 B1 | 4/2002 | Kurokawa | |
| 6,375,210 B1 | 4/2002 | Lam | |
| 6,481,522 B1 | 11/2002 | Adachi | |
| 6,805,373 B2 * | 10/2004 | Singenberger | B62K 19/34 280/281.1 |
| 6,874,676 B1 | 5/2005 | Elkouh et al. | |
| 6,889,992 B2 | 5/2005 | Vroomen et al. | |
| 6,988,427 B2 * | 1/2006 | Yamanaka | B25B 27/0071 384/545 |
| 7,762,571 B2 * | 7/2010 | Dodman | B62K 19/34 280/274 |
| 8,042,822 B2 | 10/2011 | D'Aluisio | |
| 8,066,295 B1 * | 11/2011 | Cusack | B29C 70/446 280/274 |
| 8,113,530 B2 * | 2/2012 | Pierick | B62K 3/04 280/281.1 |
| 8,393,794 B1 * | 3/2013 | Shiraishi | B62K 19/34 384/458 |
| 8,579,316 B2 | 11/2013 | D'Aluisio et al. | |
| 8,641,071 B2 * | 2/2014 | D'Aluisio | B62K 3/04 280/281.1 |
| 8,678,417 B1 * | 3/2014 | Chang | B62M 6/90 264/258 |
| 8,882,125 B2 * | 11/2014 | Paquin | B62K 19/34 280/281.1 |
| 8,925,949 B2 * | 1/2015 | Zecchetto | B62K 3/02 280/281.1 |
| 8,960,702 B2 * | 2/2015 | Vollmer | B62K 19/34 180/206.1 |
| 9,388,847 B1 * | 7/2016 | Wolfenbarger | F16C 9/02 |
| 2004/0036251 A1 * | 2/2004 | Baldwin | B60B 1/041 280/284 |
| 2008/0100029 A1 | 5/2008 | Hu | |
| 2008/0238028 A1 * | 10/2008 | Yamanaka | B62K 19/34 280/281.1 |
| 2010/0320721 A1 | 12/2010 | Chung | |
| 2013/0181424 A1 * | 7/2013 | Yu | B62K 19/28 280/281.1 |
| 2013/0300085 A1 * | 11/2013 | Zecchetto | B62K 3/02 280/281.1 |

OTHER PUBLICATIONS

United States Patent Office Notice of Allowance for U.S. Appl. No. 13/281,210 dated Sep. 27, 2013 (8 pages).
United States Patent Office Notice of Allowance for U.S. Appl. No. 12/548,214 dated Aug. 16, 2011 (4 pages).
United States Patent Office Action for U.S. Appl. No. 12/548,214 dated Mar. 23, 2011 (5 pages).
Extended European Search Report for Application No. 10812484.3 dated Dec. 20, 2012 (5 pages).
Taiwanese Patent Office Action for Application No. 099128502 dated Oct. 18, 2013 (7 pages including translation).

* cited by examiner

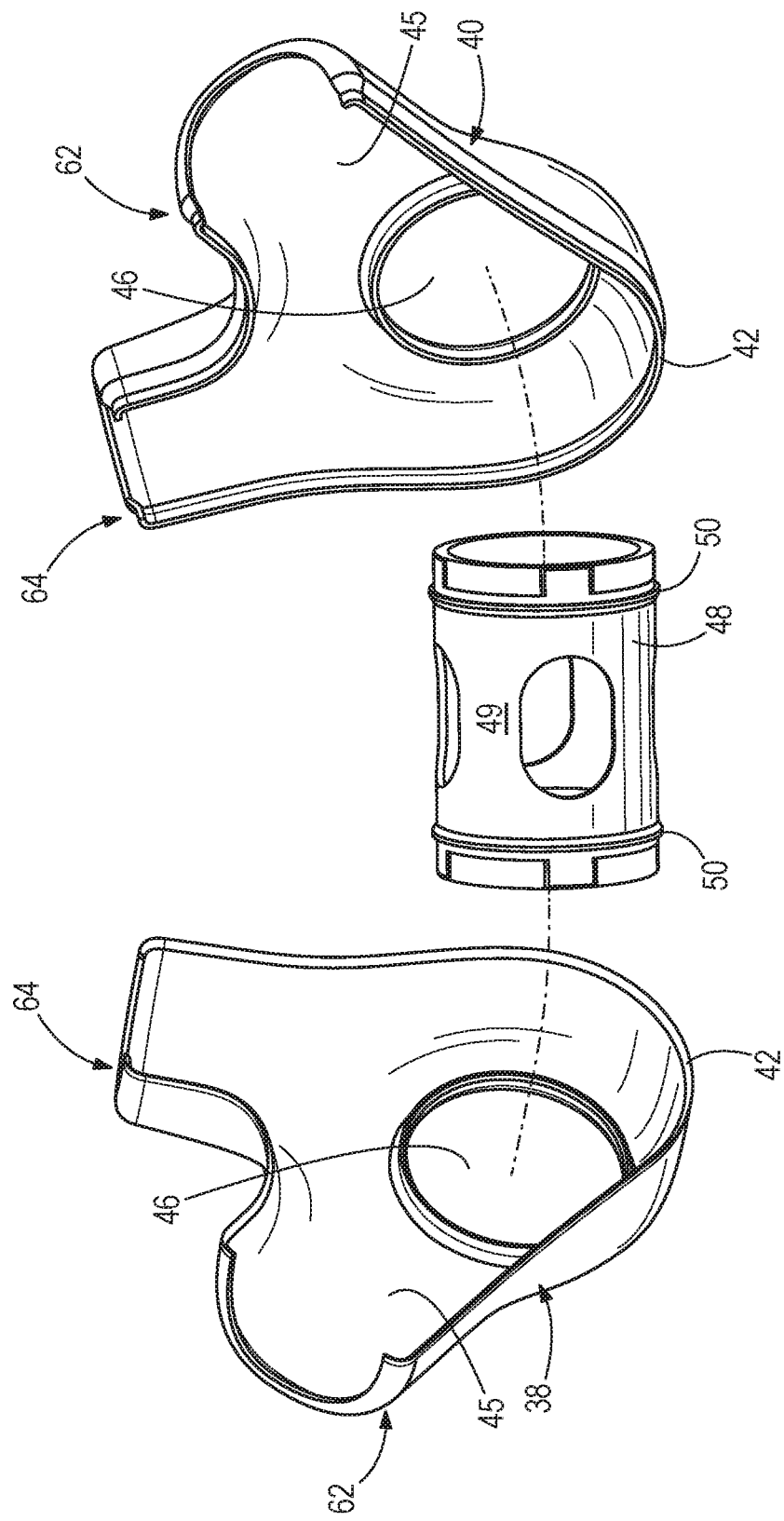

BOTTOM BRACKET ASSEMBLY AND BICYCLE

BACKGROUND

The present invention relates generally to bicycle systems, and frame assemblies. In particular, the present invention relates to a bottom bracket shell assembly for an alloy bicycle frame.

Bicycle frames traditionally comprise a plurality of tubes, including a head tube, a top tube, a down tube, a seat tube, chainstays and seat stays. A bottom bracket shell commonly connects the seat tube, down tube and chainstays and receives a bottom bracket. The bottom bracket receives a crankset of a drivetrain for rotational movement, which transforms forces created by the rider during pedaling into power to drive the rear wheel. The bottom bracket shell functions as the central support for the forces created by the rider, including the gravitational force transferred from the seat tube and down tube and the pedaling forces transferred from the crankset.

The bottom bracket shell in prior art alloy bicycle frames traditionally comprises a metal tube which is oriented transverse to the other tubes of the frame. The down tube and seat tube commonly have mitered ends which are configured to wrap around the bottom bracket shell. The seat tube and down tube are often welded to the circumference of the bottom bracket shell in order to form a contiguous assembly.

The welding process involves forming a joint by melting sidewalls of parent tubes and simultaneously replenishing the joint with additional material through the use of a filler rod. This process is heavily dependent on the welding operator's abilities and, because of this, the size, shape and smoothness of a weld will vary in consistency depending on the talents of the welding operator. This means that the structural strength of the bicycle frame can vary depending on the abilities of the welding operator.

Due to the relatively large diameter of the seat tube, down tube and chainstays versus the relatively small circumference of the bottom bracket shell, it is not possible to completely attach each tube directly to the bottom bracket shell. The diameters of the tubes are limited in order to fit the down tube and the seat tube on the bottom bracket shell. The diameters of the tubes are also limited because connecting the tubes near the lateral edge of the bottom bracket shell increases the risk that structural portions of the bottom bracket shell will be unintentionally burned away during the welding process. The limit on the diameters of the tubes reduces the material available to strengthen the bottom bracket, however. When the down tube and seat tube are formed from low modulus alloys such as aluminum, the thickness of sidewalls of the tubes is undesirably increased to provide the requisite structural strength to the bicycle frame. Moreover, the limited diameter of the seat tube and down tube in relation to the width of the bottom bracket shell requires that several welds be placed on top of each other. Consequently, the configuration of prior art alloy bicycle frames limits the strength to weight ratio of the bottom bracket shell.

Accordingly, there is a need in the art for an improved bottom bracket shell having an increased strength to weight ratio.

SUMMARY

The present disclosure relates to an improved bottom bracket shell assembly that is designed to increase the strength to weight ratio of bottom bracket shells for alloy bicycle frames.

Briefly stated, a bottom bracket shell assembly in accordance with the present disclosure includes left and right sidewalls. The sidewalls each include a lateral surface defining a generally circular void, and a peripheral rim configured to join the left and right sidewalls such that the bottom bracket shell assembly has contiguous front and rear surfaces. The rims may be joined by a lap joint, a flanged joint, a butt joint, or a number of other joining techniques known in the art.

Left and right first bosses project from the left and right sidewalls at a periphery of the lateral surfaces. The bottom bracket shell assembly may have as many as four bosses. The bosses are configured to mate with tubular members such as a down tube, seat tube, and chainstays. The bottom bracket shell assembly of the present disclosure moves the connection between the bottom bracket shell and the tubes to the boss ends, away from the crowded junction of the bottom bracket shell, down tube, seat tube and chainstays of the prior art, thereby avoiding multiple welds at the bottom bracket joint. Consequently, the configuration of the bottom bracket shell assembly allows the diameter of the down tube, seat tube and chainstays to be increased to the width of the bottom bracket shell without sacrificing the strength of the bottom bracket shell assembly.

BRIEF DESCRIPTION OF THE PREFERRED EMBODIMENT

FIG. 3 shows an exploded view of the bottom bracket shell assembly of FIG. 2;

DETAILED DESCRIPTION OF THE PREFERRED EMBODIMENT

Figure 1:
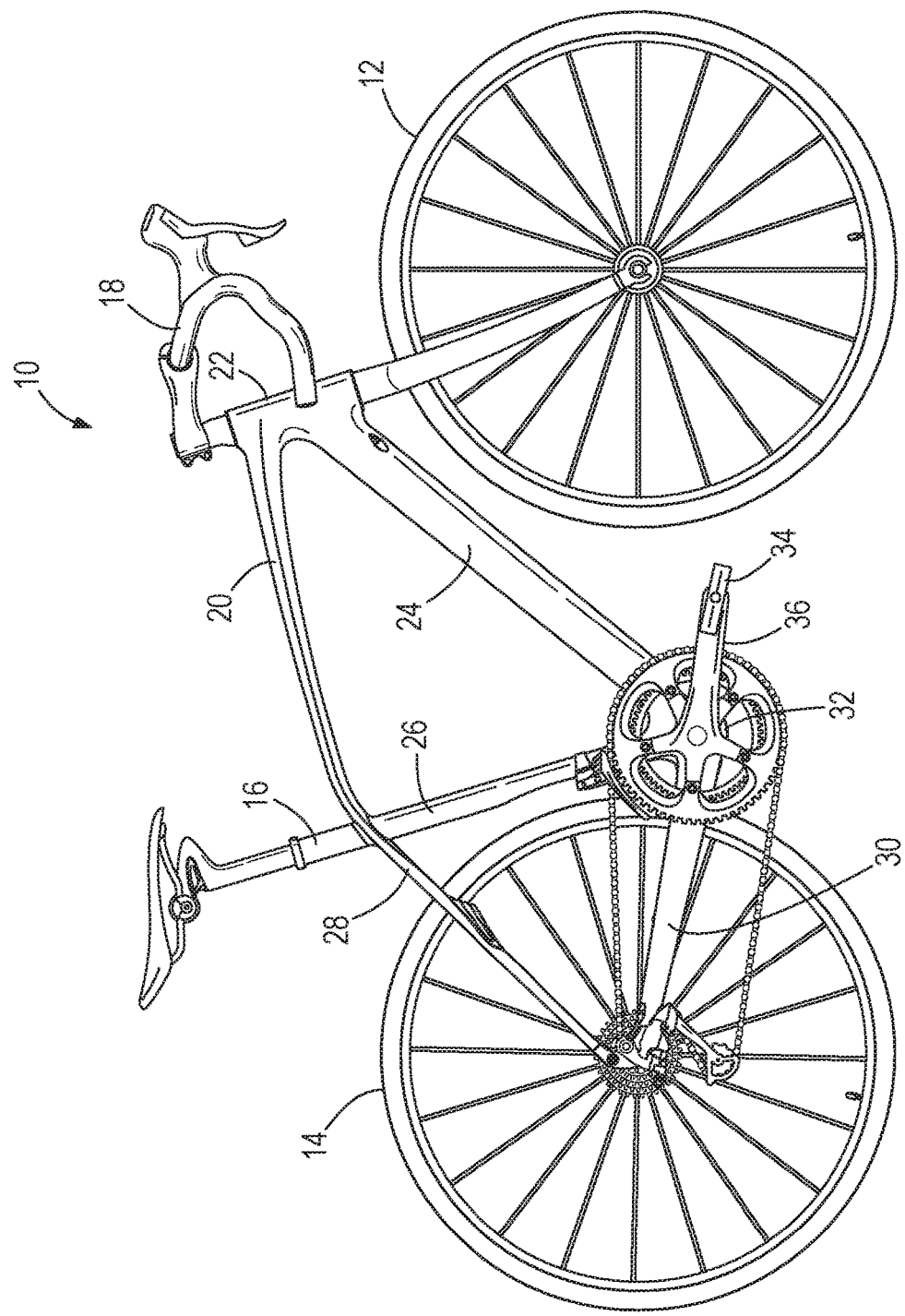
FIG. 1 shows a side view of a bicycle constructed in accordance with the present disclosure.

FIG. 1 depicts a bicycle 10 that includes a front wheel 12, a rear wheel 14, a frame 16 and a steering assembly 18. The frame 16 includes a top tube 20, a head tube 22, a down tube 24, a seat tube 26, seat stays 28, chainstays 30 and a bottom bracket shell assembly 32. Pedals 34 are attached to a crankset 36 to allow a rider to rotate the crankset 36 and propel the bicycle 10, as is known in the art.

Figure 2:
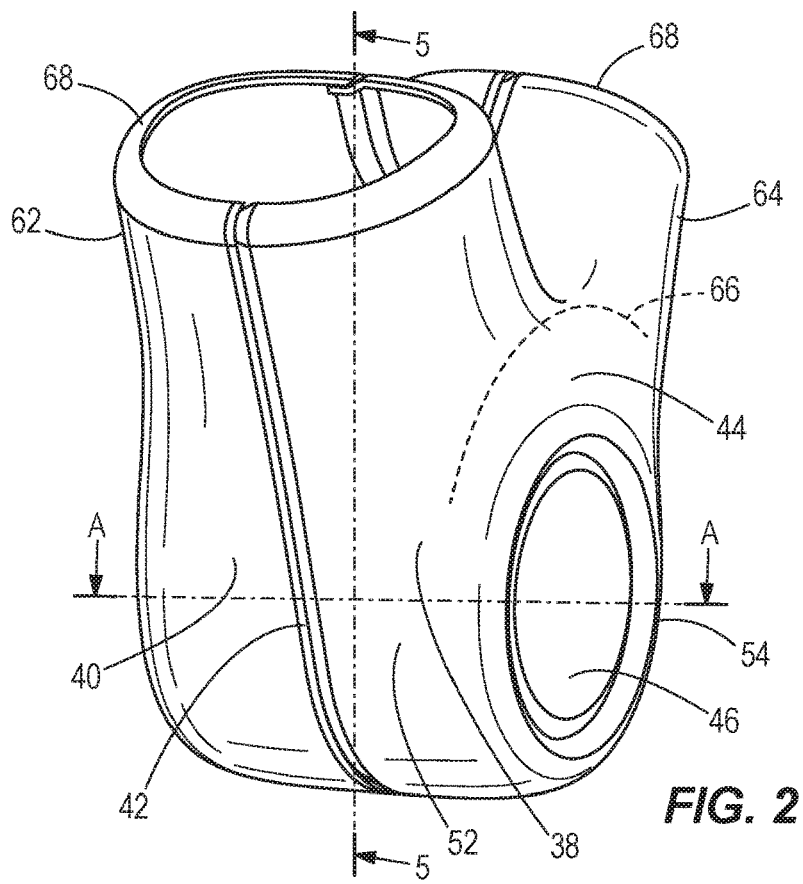
FIG. 2 shows a perspective view of one embodiment of the bottom bracket shell assembly of the present disclosure.

FIGS. 2 and 3 show one embodiment of a bottom bracket shell assembly 32 of the present disclosure. Referring specifically to the exploded view shown in FIG. 3, the bottom bracket shell assembly 32 is separated into two longitudinal halves and includes left and right sidewalls 38 and 40, each having a peripheral rim 42. As the bottom bracket shell 32 of the present disclosure is contemplated for use in aluminum bicycle frames, the sidewalls 38, 40 can be formed from solid or hollow forgings, sheet metal stampings or hydro-formed pieces. One of ordinary skill in the art will realize that the principles disclosed herein could easily be applied to other metal alloy and composite frames, however.

Referring to FIG. 2, the sidewalls 38, 40 each have a lateral surface 44 and are joined at the peripheral rim 42 to form contiguous front and rear surfaces 52 and 54. As will be described in further detail below, the peripheral rims 42 may be joined by brazing, welding, bonding or any other method known in the art. As seen in FIG. 2, the contiguous front and rear surfaces 52, 54 have a generally convex shape so as to mimic the generally tubular shape of the down tube and seat tube 24 and 26 shown in FIG. 1.

FIGS. 2 and 3 show the left and right sidewalls 38, 40 joined at the peripheral rim 42. In this embodiment, the peripheral rim 42 is connected at a lap joint 60 (see FIG. 2A), which is welded or brazed to form the contiguous front and rear surfaces 52, 54. Alternatively, the connection between the peripheral rims 42 may be formed by a butt joint or a flange joint. Regardless of the specific connection utilized, the connection between the peripheral rims 42 of the left and right sidewalls 38, 40 reduces assembly time and increases consistent placement of a weld bead or braze joint by providing a pre-defined location for the manufacturer to join the left and right sidewalls 38, 40.

Figure 2A:
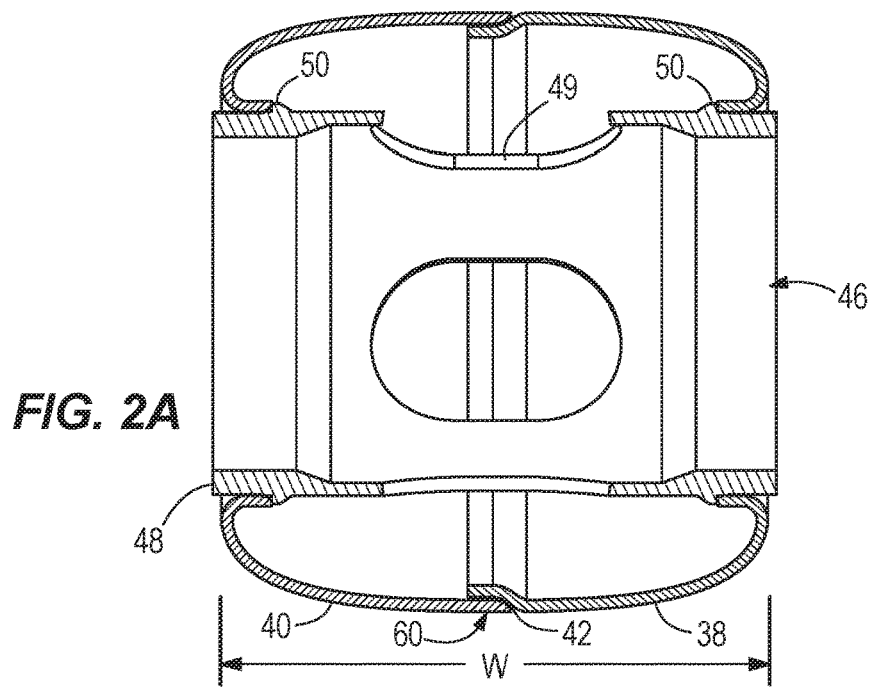
FIG. 2A shows a cross-sectional view of the bottom bracket shell assembly of FIG. 2 taken along line A-A.
Figure 4:
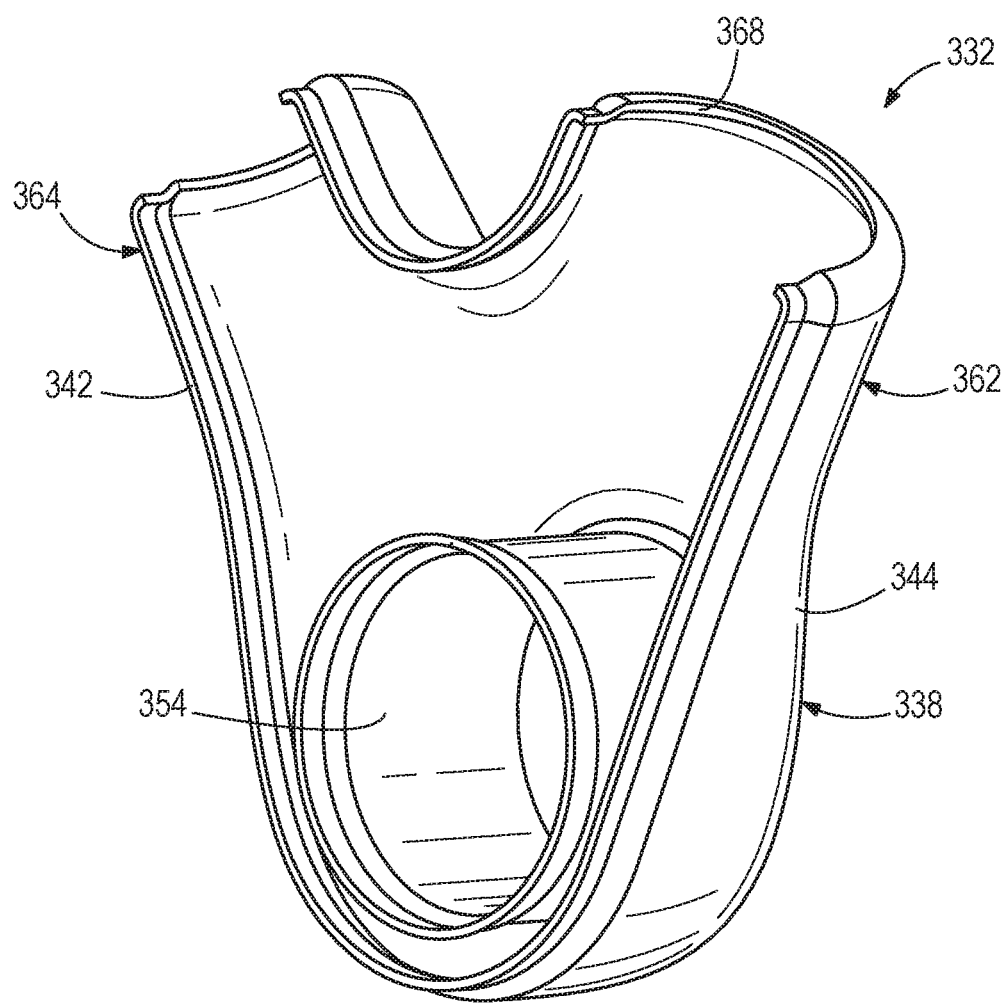
FIG. 4 shows a perspective view of a first sidewall of the bottom bracket shell assembly of a different embodiment of the bottom bracket shell assembly of the present disclosure.

As shown in FIGS. 2A and 3, each of the left and right sidewalls 38, 40 defines a cut out 46 at the lateral surface 44 which communicates with an internal cavity 45 of the bottom bracket shell assembly 32 defined by the sidewalls 38, 40. The cavity 45 is dimensioned to receive a bearing support (see FIG. 3), which receives first and second bearing assemblies (not shown) which rotationally receive a crank arm spindle (not shown) as is known in the art. As best seen in FIG. 3, the illustrated bearing support is a separate tubular insert 48. The insert 48 has a pair of circumferential ridges 50 which project from an outer surface 49 of the insert 48 (See also FIGS. 11-13). Referring to FIG. 2A, the ridges 50 abut the edges of the cutout 46 and secure the insert 48 within the cavity 45, tying the sidewalls 38, 40 together and thereby increasing the stiffness of the bottom bracket shell assembly 32.

Figure 10:
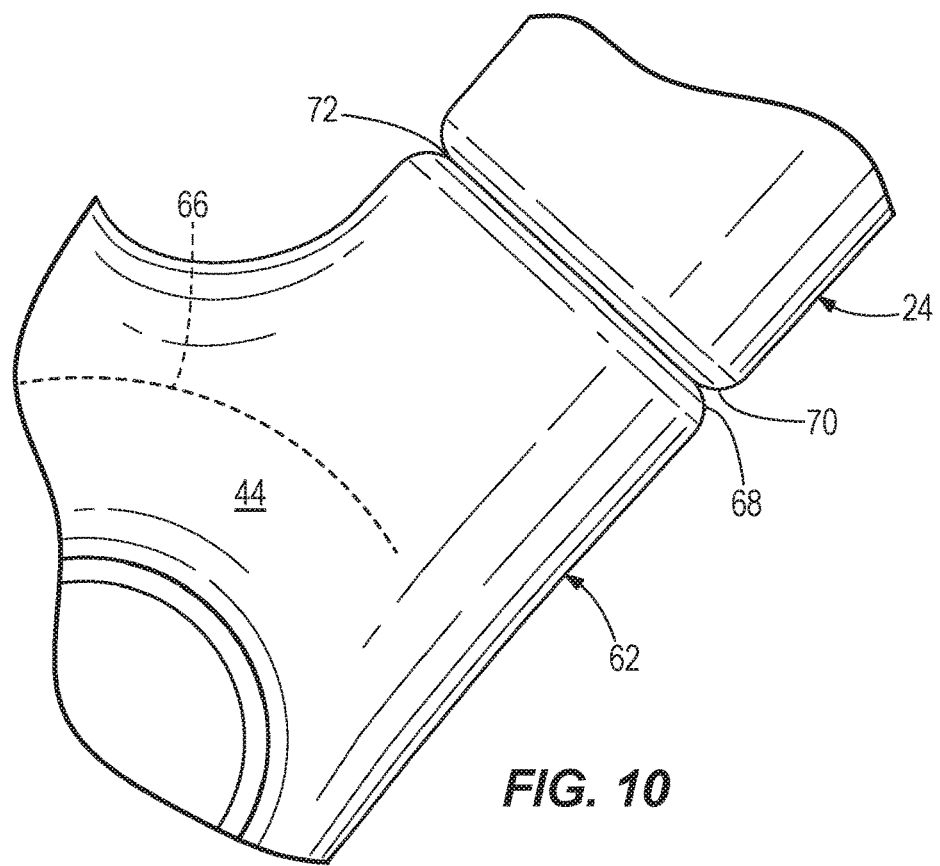
FIG. 10 shows a side view of a connection between a bottom bracket shell assembly of the present disclosure and a down tube.

Referring to FIGS. 2, 3 and 10, left and right down tube and seat tube bosses 62, 64 project from a periphery 66 of the lateral surface 44 of each sidewall 38, 40. In FIG. 2 the periphery 66 is demarcated by a dotted line. The bosses 62, 64 each have an interface portion in the form of a tapered portion 68 at an end opposite the periphery 66. FIG. 10 shows a side view of a bottom bracket shell assembly 32 and down tube 24, with particular emphasis on the connection between the first boss 62 and the down tube 24. The down tube 24 and seat tube 26 also include interface portions in the form of tapered portions 70. The tapered portions 70 of the down tube and seat tube fit within the tapered portion 68 of the bosses 62, 64, in much the same way as the top tube and down tube fit within the tapered portion of the head tube as described in U.S. Pat. Nos. 8,042,822 and 8,579,316 which are both assigned to the Applicant, and incorporated herein by reference. The bosses 62, 64 are connected to the down tube 24 and seat tube 26 to form a channel 72 defined by the tapered portions 68,70 and adapted to receive a weld bead or a braze joint during the appropriate manufacturing operation.

Moving the structural connection between the down tube 24, seat tube 26, chain stays 76 and bottom bracket shell assembly 32 away from the bottom bracket shell eliminates the need to connect (e.g., weld or braze) multiple structural members within a confined space. Additionally, the bottom bracket shell assembly 32 can be split longitudinally into left and right sidewalls 38, 40. The left and right sidewalls 38, 40 can be more efficiently shaped than prior art bottom bracket shell assemblies because the important structural connections are moved away from the bottom bracket shell.

Referring to FIG. 2A, the bottom bracket shell assembly has a width W as measured between the lateral surfaces 44 of each sidewall 38, 40. The risk of burning away the material at the bottom bracket shell during welding is diminished because the connection between the tubes and the bosses is moved to the boss ends (see FIG. 10) and away from the bearing support. Accordingly, the diameter of the down tube 24 and seat tube 26 can be increased in comparison with the prior art, and the sidewalls 38, 40 can be shaped such that the width W of the bottom bracket shell assembly is approximately equal to the diameter D. Moreover, a layered series of welds are no longer required to provide the bottom bracket shell assembly 32 with the strength required to withstand the forces created while riding the bicycle 10. Consequently, the configuration of the bottom bracket shell assembly 32 of the present disclosure significantly increases the potential strength to weight ratio over the prior art.

A number of alternatives to the preferred embodiment of FIGS. 2, 3 and 10 are described below.

Figure 11:
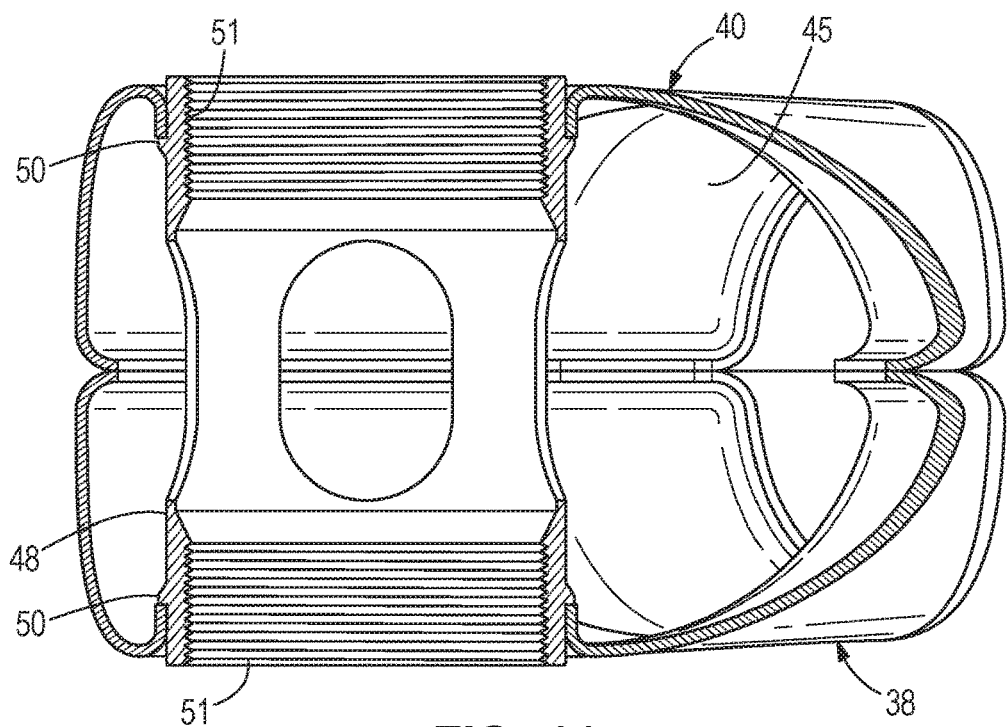
FIG. 11 shows a cross-sectional view of the bottom bracket shell assembly of FIG. 2 taken along line A-A and showing one embodiment of a connector of the bearing support.
Figure 12:
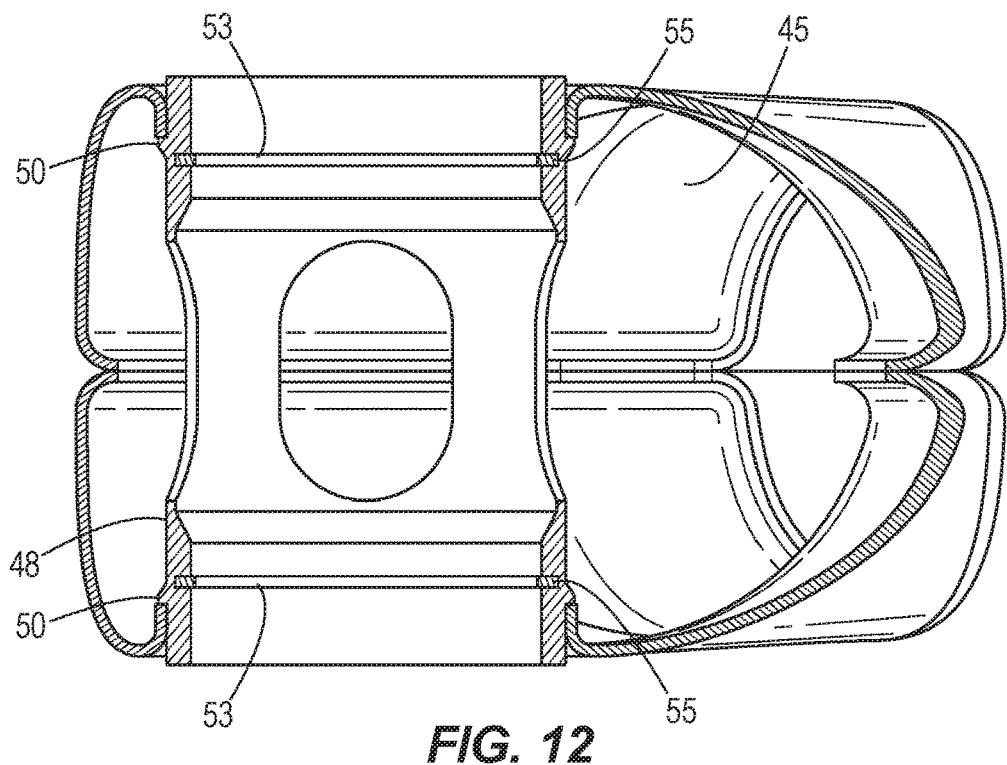
FIG. 12 shows a cross sectional view of an alternative embodiment of the connector feature of FIG. 11.
Figure 13:
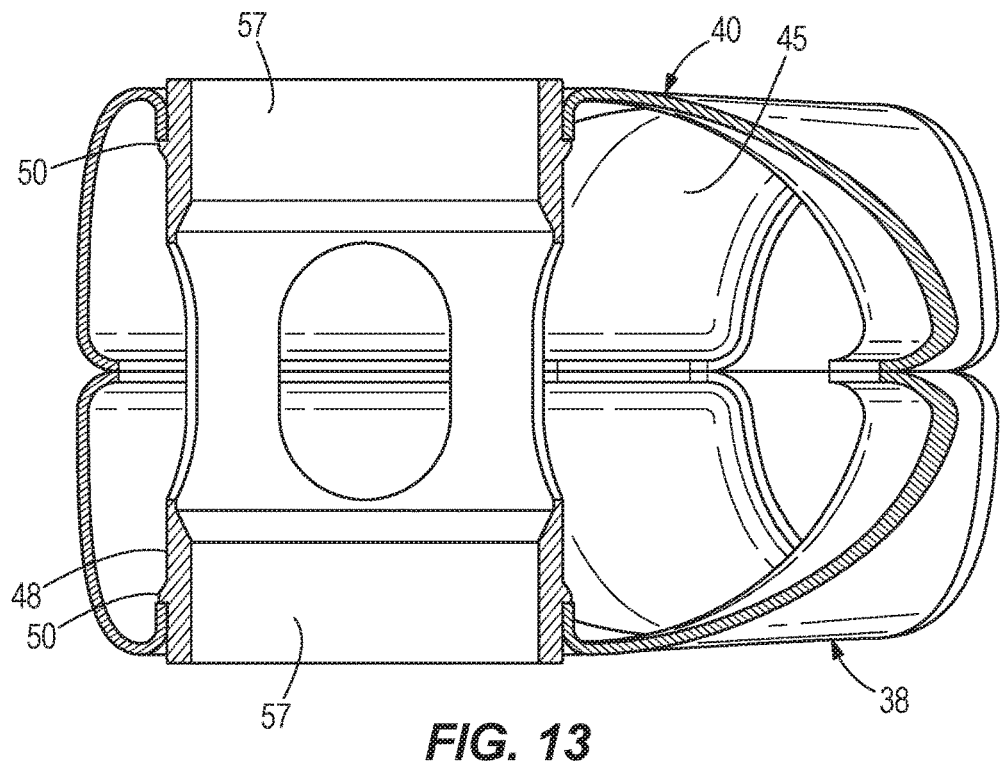
FIG. 13 shows a cross-sectional view of an alternative embodiment of the connector feature of FIGS. 11 and 12.

Bearing Connectors (FIGS. 11-13)

FIGS. 11-13 show various alternative embodiments of a connector to secure the bearings to the insert 48. The connector may include a female portion 51 of a threaded connector system (FIG. 11), a snap ring 53 disposed within an annular notch 55 defined by an inner surface of the insert 48 (FIG. 12), or a machined surface 57 configured to form a press-fit connection with the bearing (FIG. 13).

Figure 15:
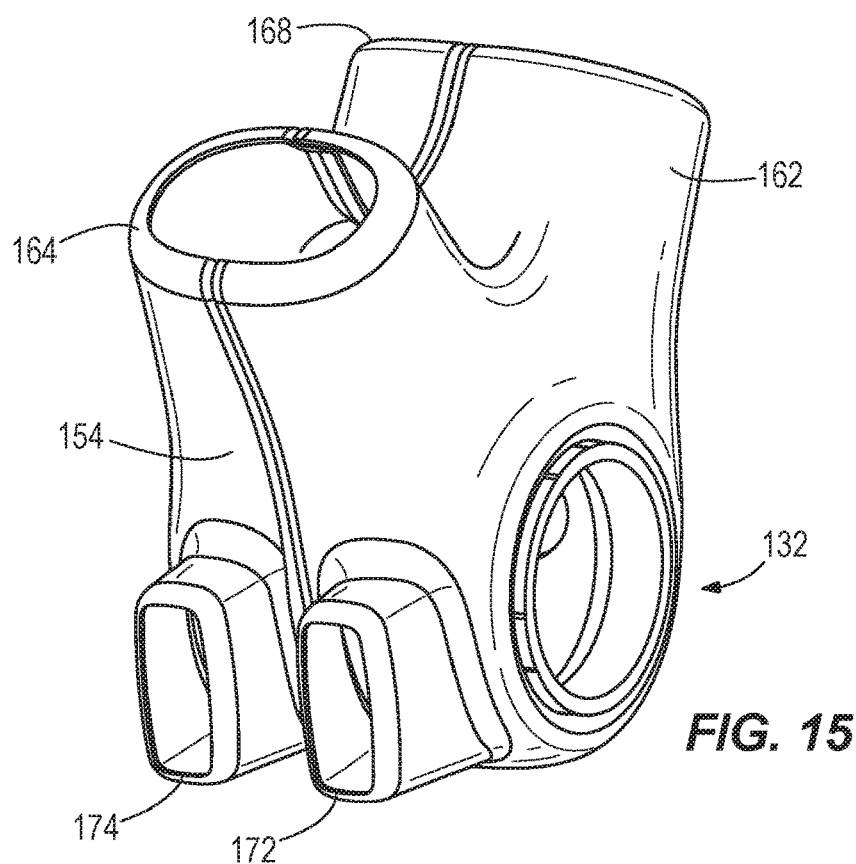
FIG. 15 shows a perspective view of a bottom bracket shell assembly of the present disclosure.
Figure 16:
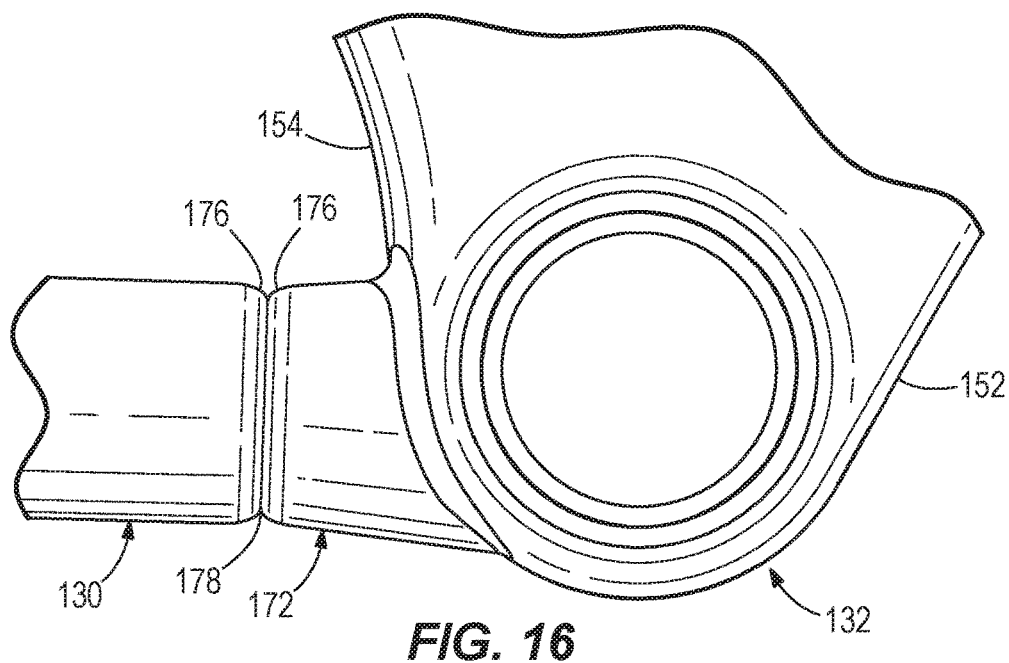
FIG. 16 shows a side view of the bottom bracket shell assembly of FIG. 15 with a chainstay in position relative to the bottom bracket shell assembly.

Chainstay and Seatstay Bosses (FIGS. 15-16)

An alternative embodiment of the bottom bracket shell assembly 132 is shown in FIGS. 15 and 16 and includes right and left chainstay bosses 172, 174, which project from the rear surface 154 of the sidewalls 164. The bottom bracket shell assembly 132 of FIGS. 15 and 16, including the right and left chainstay bosses 172, 174, is hydro-formed as one piece. Alternatively, the right and left chainstay bosses 172, 174 may be welded onto the rear surface 154 after hydroforming. Additionally, the sidewalls can alternatively be formed by forging, casting or any other appropriate method of manufacture.

As best seen in FIG. 16, the right and left chainstay bosses 172, 174 and chainstays 130 each have interface portions in the form of tapered portions 176, similar to the down tube and seat tube bosses of FIGS. 2, 3 and 10. The chainstays 130 include tapered portions 176 that fit within tapered portions 177 of the left and right chainstay bosses 172, 174, and a weld bead or braze joint is placed in a peripheral channel 178 defined by the chainstay tapered portions 176 and the tapered portions 177 of the left and right chainstay bosses 172, 174.

Figure 14:
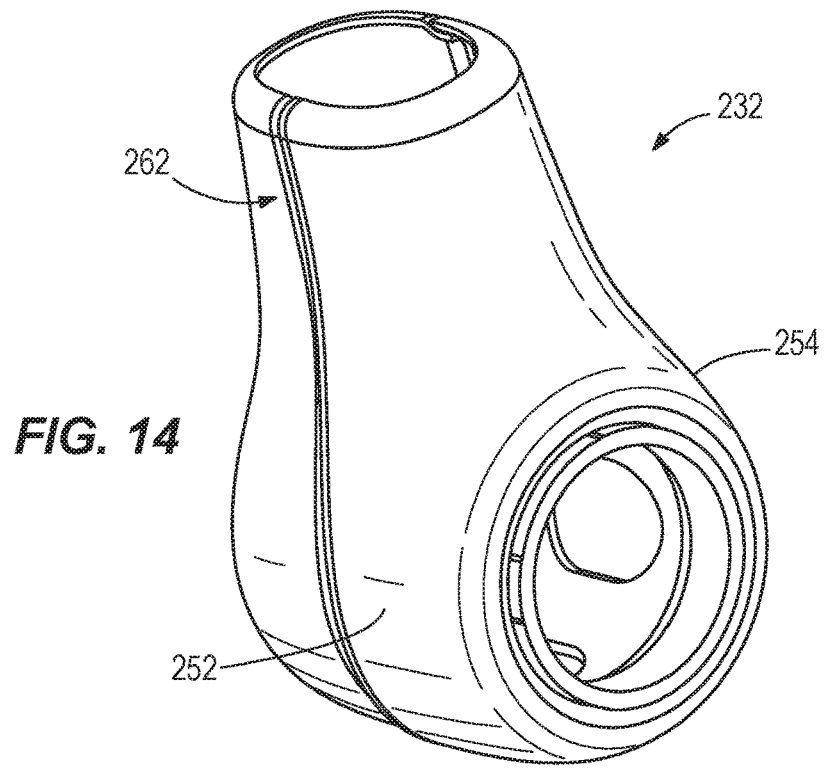
FIG. 14 shows a perspective view of an alternative embodiment of the bottom bracket shell assembly of the present disclosure.

Single Boss Embodiment (FIG. 14)

As shown in FIG. 14, an alternative embodiment of the bottom bracket shell assembly 232 include a single boss 262 that is connected to one of either the down tube or the seat tube (not shown). In this embodiment, the other of the down tube or seat tube is connected to the front or rear surface 252 or 254 and the chainstays (not shown) are connected to the rear surface 254.

Integral Bearing Support Embodiment (FIGS. 4-7)

Figure 5:
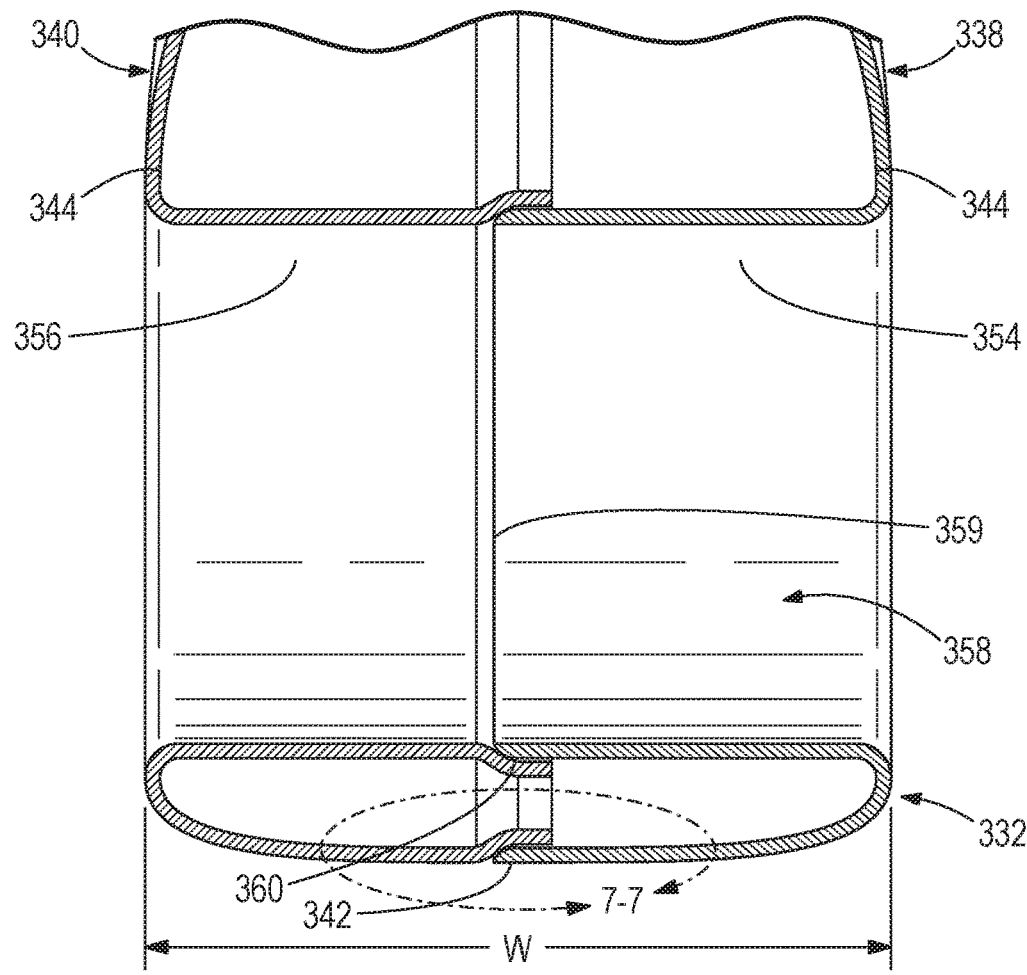
FIG. 5 shows a cross-sectional view of the bottom bracket shell assembly of FIG. 4 taken along line 5-5.
Figure 7:
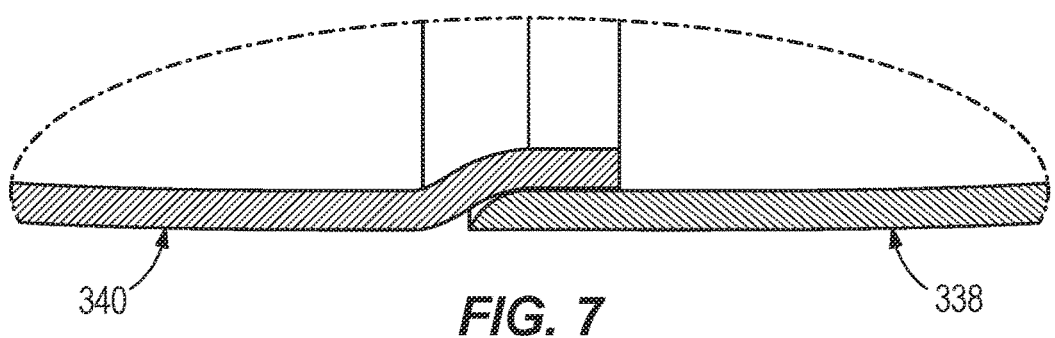
FIG. 7 shows an enlargement of the area in FIG. 5 demarcated by circle 7-7.
Figure 6:
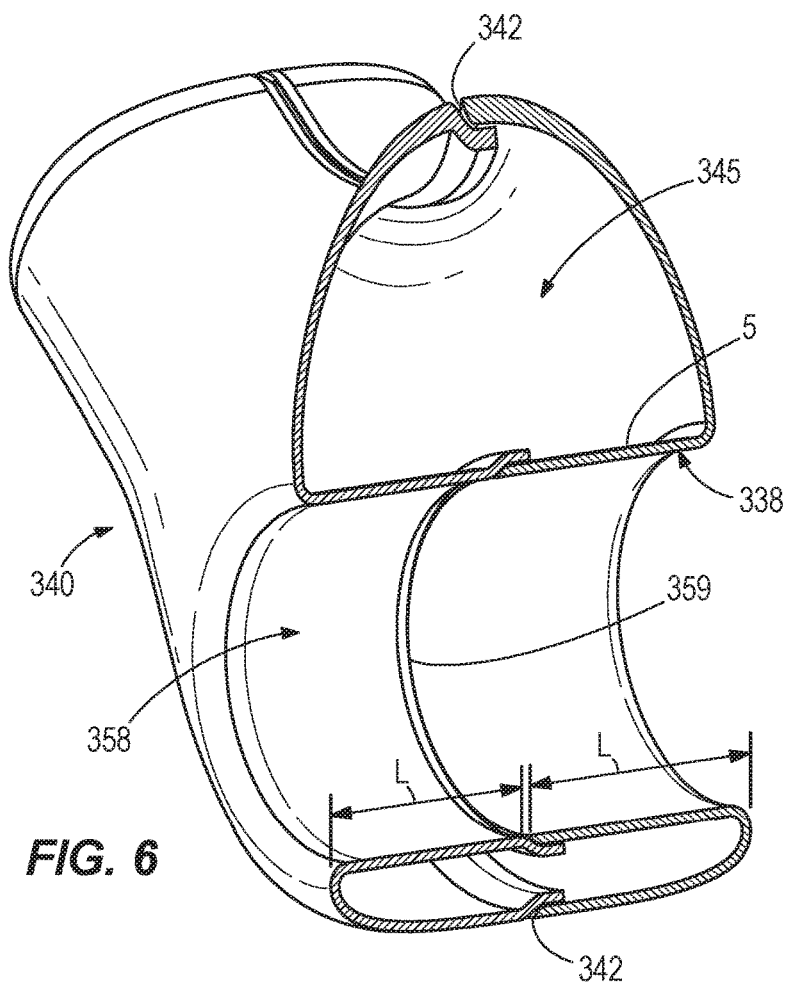
FIG. 6 shows a perspective cross-sectional view of the bottom bracket shell assembly of FIG. 4 taken along line 5-5.

FIGS. 4-7 depict a bottom bracket shell 332 including an alternative embodiment of the bearing support. In this embodiment, material from the left and right sidewalls 338,340 is folded inwardly at the lateral surface 344 to form left and right flanges 354, 356. The right sidewall 340 is omitted from FIG. 4 to more clearly show the left flange 354. As best seen in FIGS. 5 and 6, the left and right flanges 354, 356 are joined at an interior seam 359 to form an integral bearing support 358. The first and second flanges in FIGS. 5 and 6 are joined at the interior seam by a lap joint 360, however one of ordinary skill in the art will realize that the interior seam may also be formed by other methods of joining such as a butt joint or a flanged joint. Referring to FIG. 6, the first and second flanges 354, 356 each project inwardly from the lateral surface 344 a length L. In one embodiment, the length L is approximately 46 mm.

Figure 8:
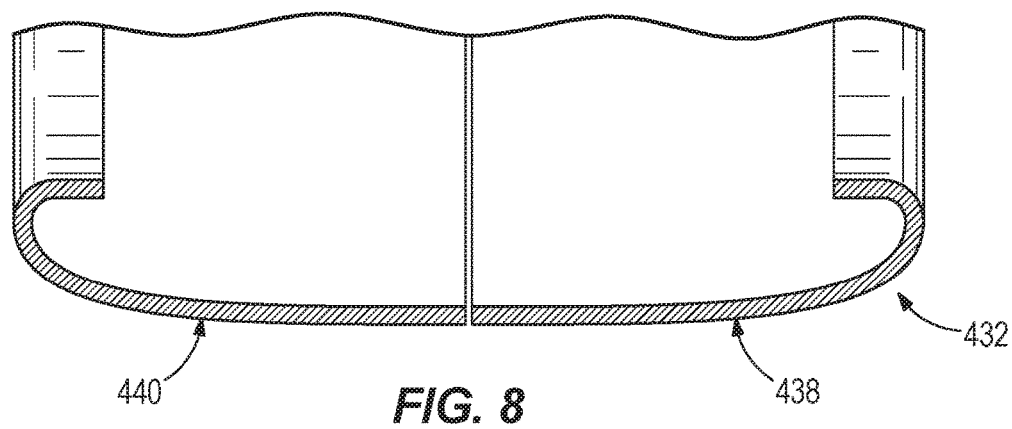
FIG. 8 shows a cross-sectional view of an alternative embodiment of the connection of left and right halves of the bottom bracket shell assembly of the present disclosure.
Figure 9:
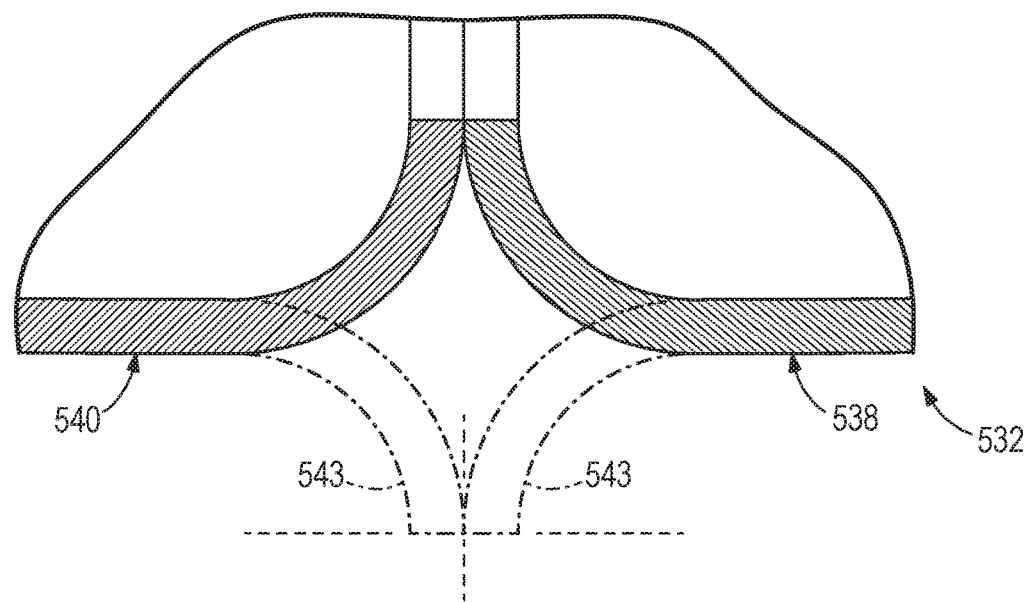
FIG. 9 shows a cross-sectional view, partly in phantom, of an alternative embodiment of the connection of left and right halves of the bottom bracket shell assembly of the present disclosure.

Butt Joint and Assembly Joint Connections (FIGS. 8 and 9)

FIGS. 8 and 9 show alternative embodiments of connecting left and right sidewalls of bottom bracket shell assemblies 432 and 532 (respectively). In the embodiment shown in FIG. 8, the peripheral rims 442 of the left and right sidewalls 438, 440 are joined at a butt joint. In the embodiment shown in FIG. 9, the peripheral rims 542 of the left and right sidewalls 538, 540 are joined at a flange joint.

The peripheral rims of either embodiment may be brazed, welded, bonded or secured by any other suitable method of joining. In one alternative method shown in phantom in FIG. 9, flanges 543 may project outwardly at the peripheral rim 542 as shown in phantom rather than project inwardly from the peripheral rim 542 as shown in solid. The outwardly projecting flanges 543 shown in phantom are subsequently joined by a roll seam using methods known in the art.

Although the foregoing systems and methods have been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein.

The invention claimed is:

1. A bottom bracket shell assembly comprising:
   a left sidewall and a right sidewall each including a peripheral rim and a lateral surface and defining a generally circular void at the lateral surface, wherein the peripheral rim of the left sidewall and the peripheral rim of the right sidewall are joined to each other at a lap joint;
   a bearing support disposed at the void of the left sidewall and the void of the right sidewall; and
   a left first boss and a right first boss projecting away from a periphery of the lateral surface of the left sidewall and a periphery of the lateral surface of the right sidewall, respectively, and sized to connect to a first tubular member at a first boss end;
   wherein the left sidewall and the right sidewall are joined at the peripheral rim of the left sidewall and the peripheral rim of the right sidewall to form a contiguous front surface and a contiguous rear surface;
   wherein the first boss end has an interface portion configured to engage with an interface portion of the first tubular member to create a tube joint; and
   wherein the tube joint includes:
      a peripheral channel defined between the interface portion of the first boss end and the interface portion of the first tubular member, wherein at least one of the interface portion of the first boss end or the interface portion of the first tubular member is at least partially defined by a substantially flat face wall; and
      a weld positioned in the peripheral channel.

2. The bottom bracket shell assembly of claim 1, further comprising a left second boss and a right second boss projecting away from the periphery of the lateral surface of the left sidewall and the periphery of the lateral surface of the right sidewall, respectively, and sized to cooperatively connect to a second tubular member at a second boss end.

3. The bottom bracket shell assembly of claim 1, wherein the bearing support comprises a tubular insert received by the void of the left sidewall and the void of the right sidewall such that the tubular insert spans a space between the left sidewall and the right sidewall and is oriented generally transverse to the lateral surface of the left sidewall and the lateral surface of the right sidewall.

4. The bottom bracket shell assembly of claim 1, wherein the bearing support comprises a first flange and a second flange integral with the left sidewall and the right sidewall, respectively, and projecting inwardly from the left sidewall and the right sidewall, respectively, at the void of the left sidewall and the void of the right sidewall.

5. The bottom bracket shell assembly of claim 4, wherein each of the first flange and the second flange projects inwardly such that the first flange and the second flange meet and are joined by an interior seam.

6. The bottom bracket shell assembly of claim 1, further comprising a third boss projecting from the contiguous rear surface.

7. The bottom bracket shell assembly of claim 6, wherein the third boss is sized to be connected to a third tubular member.

8. The bottom bracket shell assembly of claim 6, wherein the third boss projects from the contiguous rear surface at the left sidewall and a fourth boss projects from the contiguous rear surface at the right sidewall so as to connect to a third tubular member and a fourth tubular member, respectively.

9. A bicycle assembly comprising:
a frame including a top tube having a first end and a second end;
a down tube having a first end and a second end;
a head tube connected to the first end of the top tube and the first end of the down tube;
a seat tube having a first end and a second end and connected to the top tube adjacent the first end of the seat tube,
a bottom bracket shell assembly including a left sidewall and a right sidewall each having a lateral surface and joined at a peripheral rim of the left sidewall and a peripheral rim of the right sidewall at a lap joint to form a contiguous rear surface and a contiguous front surface, each of the left sidewall and the right sidewall defining a generally circular void configured to receive a bearing support, the bottom bracket shell assembly further including a seat tube boss and a down tube boss projecting away from a periphery of the lateral surface of the left sidewall and a periphery of the lateral surface of the right sidewall and terminating in seat tube boss ends and down tube boss ends, respectively,
wherein the second end of the seat tube is connected to the seat tube boss ends and the second end of the down tube is connected to the down tube boss ends;
wherein the seat tube boss ends have interface portions configured to engage with an interface portion of the second end of the seat tube to create a tube joint;
wherein the tube joint includes:
a peripheral channel defined between the interface portions of the seat tube boss ends and the interface portion of the second end of the seat tube, wherein at least one of the interface portions of the seat tube boss or the interface portion of the second end of the seat tube is at least partially defined by a substantially flat face wall; and
a weld positioned in the peripheral channel.

10. A bottom bracket shell assembly comprising:
a left sidewall and a right sidewall each including a peripheral rim and a lateral surface and defining a generally circular void at the lateral surface;
a bearing support disposed at the void of the left sidewall and the void of the right sidewall, wherein the bearing support comprises a first flange and a second flange integral with the left sidewall and the right sidewall, respectively, and projecting inwardly from the left sidewall and the right sidewall, respectively, at the void of the left sidewall and the void of the right sidewall;
a left first boss and a right first boss projecting away from a periphery of the lateral surface of the left sidewall a periphery of the lateral surface of the right sidewall, respectively, and sized to connect to a first tubular member at a first boss end;
wherein the left sidewall and the right sidewall are joined at the peripheral rim of the left sidewall and the right sidewall to form a contiguous front surface and a contiguous rear surface.

11. The bottom bracket shell assembly of claim 10, wherein each of the first flange and the second flange projects inwardly such that the first flange and the second flange meet and are joined by an interior seam.

12. The bottom bracket shell assembly of claim 10, wherein the bearing support further comprises a tubular insert received by the void of the left sidewall and the void of the right sidewall such that the tubular insert spans a space between the left sidewall and the right sidewall and is oriented generally transverse to the lateral surface of the left sidewall and the lateral surface of the right sidewall.

13. The bottom bracket shell assembly of claim 12, wherein the tubular insert includes a first circumferential ridge engaged with the first flange.

14. The bottom bracket shell assembly of claim 13, wherein the tubular insert includes a second circumferential ridge engaged with the second flange.

* * * * *